C. HALSTEAD.
Coffee-Pot.
No. 203,268. Patented May 7, 1878.
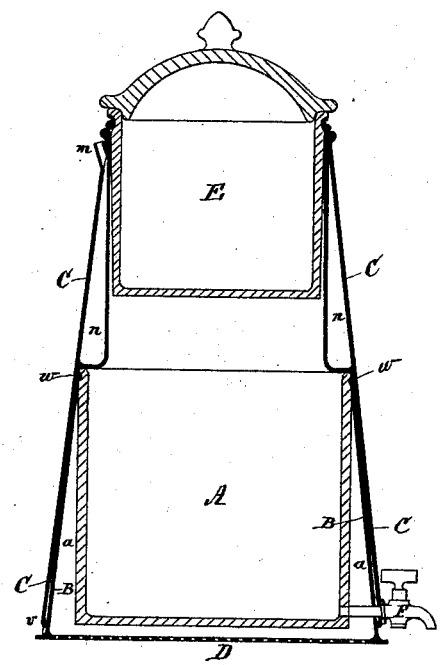
Witnesses.
Inventor.
Charles Halstead
per Henry E. Roeder
Attorney.

UNITED STATES PATENT OFFICE.

CHARLES HALSTEAD, OF NEW YORK, N. Y.

IMPROVEMENT IN COFFEE-POTS.

Specification forming part of Letters Patent No. 203,268, dated May 7, 1878; application filed October 19, 1877.

*To all whom it may concern:*

Be it known that I, CHARLES HALSTEAD, of New York, in the State of New York, have invented a new and Improved Coffee-Pot, which improvement is fully set forth in the following specification, reference being had to the accompanying drawing, representing a vertical section of my improved coffee-pot.

A vessel, A, made of china or earthenware, is attached near its upper end $w$ to a cylindrical casing, B, provided with a perforated bottom, D, in such a manner as to leave an air-chamber, $a$, all around said interior vessel A. Around this casing B another casing, C, is fitted, attached near $w$ and near its bottom, at $v$, to the inner casing B, so as to leave a small air-space from $w$ to $v$ between the same. In the upper part of the casing C a water-chamber, $n$, is arranged, and a vessel, E, made removable, is fitted into the upper part of said casing C. To the water-chamber $n$ a pipe, $m$, is connected, to fill the same with water, and at the lower end of the vessel A a cock, F, is fitted, to draw off the coffee as desired. Instead of this cock F, a common spout may be attached to the casing C above the top of the china vessel A, to empty the same by tilting the pot.

The top of the vessel E is closed by the usual cover.

The coffee, which may be placed either in a perforated chamber or into a linen bag, is put into the inner vessel A, and boiling water poured upon the same to obtain the required infusion of the coffee. The coffee-pot is then placed upon the oven, where the heat will pass through the perforated bottom D into the air-chamber $a$ around the vessel A, and thus keep the water or coffee at a boiling-point till required.

The small air-space between the inner casing B and the outer casing C prevents the cooling of the air in this air-chamber $a$.

Into the upper vessel E milk may be placed, to be warmed or boiled at the same time, or the same may be filled with cold water. Whether filled with milk or water, the surface of this chamber E, together with the inner surface of the water-chamber $n$, which is supplied with cold water through its opening $m$, will act as condensers, to condense the steam and the essential oil rising from the lower part of the coffee-pot, and which constitutes the aroma of the coffee, and return the same to the infusion.

What I claim as my invention, and desire to secure by Letters Patent, is—

The combination of the china or earthenware vessel A, casing B, provided with perforated bottom D, and forming an air-chamber, $a$, around the inner vessel, and the outer casing C, with water-chamber $n$ in its upper part, arranged substantially in the manner and for the purpose described.

CHARLES HALSTEAD.

Witnesses:
 HENRY E. ROEDER,
 J. B. NONES.